United States Patent
Li et al.

(10) Patent No.: US 7,667,795 B2
(45) Date of Patent: Feb. 23, 2010

(54) COLOR FILTER SUBSTRATE AND LIQUID CRYSTAL DISPLAY PANEL

(75) Inventors: De-Jiun Li, Taipei County (TW); Der-Chun Wu, Taipei County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 576 days.

(21) Appl. No.: 11/309,241

(22) Filed: Jul. 18, 2006

(65) Prior Publication Data

US 2008/0018835 A1    Jan. 24, 2008

(51) Int. Cl.
G02F 1/1335 (2006.01)
G02F 1/1339 (2006.01)

(52) U.S. Cl. .................. 349/106; 349/155; 349/104; 349/156; 349/157

(58) Field of Classification Search ............ 349/106, 349/104, 105, 122, 155, 156, 157, 160
See application file for complete search history.

(56) References Cited

U.S. PATENT DOCUMENTS

| 7,245,343 | B2* | 7/2007 | Suzuki et al. ............ 349/153 |
| 7,330,234 | B2* | 2/2008 | Murakami et al. ......... 349/155 |
| 2002/0080320 | A1* | 6/2002 | Suzuki et al. ............ 349/153 |
| 2002/0196393 | A1 | 12/2002 | Tashiro et al. ........... 349/106 |
| 2005/0185129 | A1* | 8/2005 | Kim et al. ............... 349/156 |
| 2008/0018835 | A1* | 1/2008 | Li et al. ................ 349/106 |

FOREIGN PATENT DOCUMENTS

| JP | 2001-033790 | 2/2001 | ........... 349/106 X |
| JP | 2003-057660 | 2/2003 | ........... 349/106 X |
| JP | 2004-191841 | 7/2004 | ........... 349/106 X |

* cited by examiner

*Primary Examiner*—Brian M Healy
(74) *Attorney, Agent, or Firm*—Jianq Chyun IP Office

(57) ABSTRACT

A color filter substrate, including a substrate, a light shielding layer, a color filter layer, a conductive layer, first and second spacers, is provided. The substrate has a displaying area and a dummy area. The light shielding layer is disposed on the substrate. The color filter layer is disposed on the substrate and covers the light shielding layer. The color filter layer has at least one first concave in the dummy area. The conductive layer is disposed on the substrate and covers the color filter layer and the light shielding layer. The first spacers are disposed on the conductive layer and are in the dummy area. Each first spacer has a fixing part and a supporting part. And the fixing part is disposed in the first concave. A through hole is in each first spacer. The second spacers are disposed on the conductive layer and are in the displaying area.

27 Claims, 8 Drawing Sheets

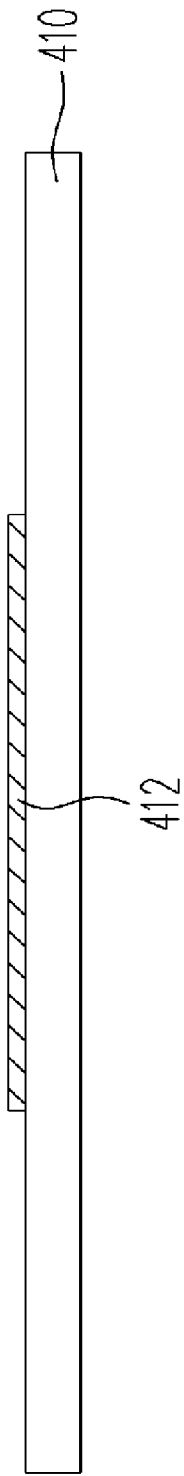
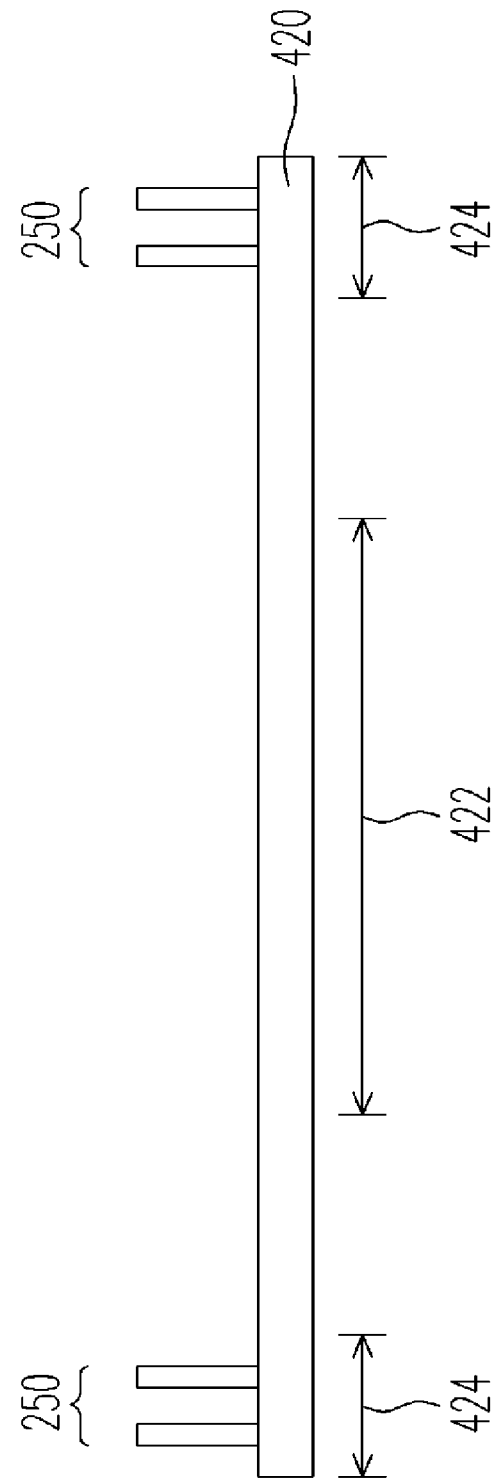
FIG. 4A
FIG. 4B

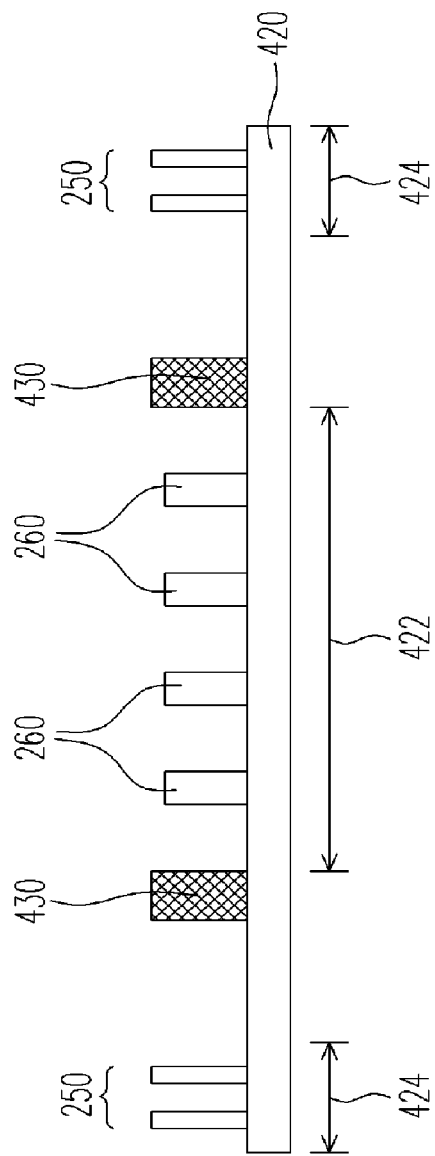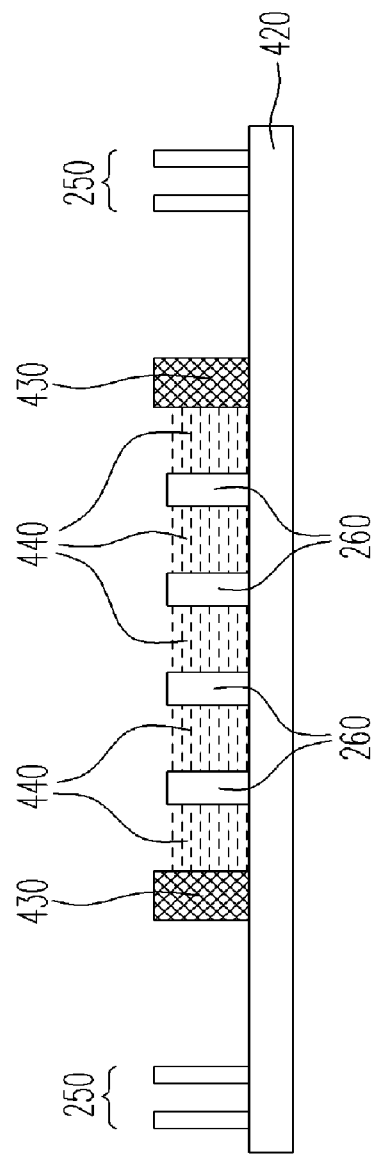

COLOR FILTER SUBSTRATE AND LIQUID CRYSTAL DISPLAY PANEL

BACKGROUND OF THE INVENTION

1. Field of Invention

The present invention relates to a filter substrate, a display panel, and a manufactured method thereof. More particularly, the present invention relates to a color filter substrate, a liquid crystal display panel, and a manufactured method thereof.

2. Description of Related Art

The flat panels have gradually take the place of the CRTs as result of the developing trends for light, thin, short and small gadgets. Among various kinds of flat panels, the liquid crystal display (LCD) has become the mainstream in the marketplace for its excellent performances such as speed, contrast ratio, view angle, and so on. The LCD is ordinarily composed of a liquid crystal display panel (LCD panel) and a backlight module. The LCD panel includes a color filter (CF) substrate, an active device array substrate and a liquid crystal (LC) layer sandwiched between. The backlight module is used to provide the planar light source which the LCD panel requires.

Particularly, displaying performance of the LCD is dramatically influenced by the thickness of the liquid crystal layer. Hence, spacers will be employed between the color filter substrate and the active device array substrate for controlling precisely the thickness of the LC layer. The spacers can be classified into stick-type spacers, ball-type spacers and photo-spacers. A spreading apparatus used for spreading the spacers between these two substrates is required for tick-type spacers and ball-type spacers which tend to get lumped in shape, causing non-uniformity of thickness of the LC layer. And therefore, an additional spreading process is needed for uniform thickness of the LC layer, and production cost is increased accordingly. The photo-spacers which are fabricated by the photolithography process, however, are recently paid much attention to by the industry. The reason is that locations and height of spacers can both be controlled to obtain uniform LC layer thickness.

Generally speaking, the function of the spacers is to support the color filter substrate and the active device array substrate, so they are fabricated as solid cylinders. Furthermore, as large-scale displays develop, multiple spacers should be placed inside the dummy area around the outer area of LCD panel for uniform stress distribution between two substrates, in addition to the placing of spacers inside the display area of LCD panel for requirements of the assembling and cutting processes.

FIG. 1 is a cross-sectional view of a traditional large-scale LCD panel. Referring to FIG. 1, the LCD panel 100 includes an active device array substrate 110, a CF substrate 120, and a LC layer 130 disposed in-between. In addition to multiple spacers 140a disposed inside the display area 102 of LCD panel 100, there are multiple spacers 140b disposed inside the dummy area 104 of LCD panel 100 for evenly supporting the two substrates.

In the manufacturing process of large-scale LCD panel 100, the region in which the LC layer 130 is filled is defined by a frame 150, and then LC layer 130 is filled in this region via the one drop fill (ODF) process. After that, the active device array substrate 110 and the color filter substrate 120 are combined together to form the LCD panel 100. Since said ODF process is performed under vacuum condition, the LCD panel 100 needs to be taken out when its frame 150 is to be applied with heat for curling. Yet, the suddenly changing pressure leads to reduce the adhesive force between the active device array substrate 110 and the color filter substrate 120, thereby causing the problem on the edges of LCD panel 100, as shown in FIG. 1. Besides, positioning misalignment between the active device array substrate 110 and the color filter substrate 120 tends to occur as well. Hence, the yield of large-scale LCD panel 100 would be affected.

SUMMARY OF THE INVENTION

Accordingly, one object of the present invention is to provide a color filter substrate, suitable for increasing the sucking force between the color filter substrate and an active device array substrate and thereby raising the yield of manufacturing large-scale panels.

Another object of the present invention is to provide a liquid crystal display panel which utilizes the color filter substrate mentioned above, for raising the yield of manufacturing large-scale panels.

One another object of the present invention is to provide a manufactured method of a LCD panel suitable for raising the yield of manufactured large-scale panels as well.

Based on the above object or other objects, the present invention provides a color filter substrate comprising a substrate, a light shielding layer, a color filter layer, a conductive layer, a plurality of first spacers, and a plurality of second spacers. The substrate has a displaying area and a dummy area. The light shielding layer is disposed on the substrate. The color filter layer is disposed on the substrate and covers the light shielding layer, and wherein the color filter layer in the dummy area has at least a first concave. The conductive layer is disposed on the substrate and it covers the color filter layer and the light shielding layer. The first spacers are disposed on the conductive layer and in the dummy area, and wherein each first spacer has a fixing part and a supporting part which is above the fixing part. The fixing part is disposed in the first concave, and there exists a through hole in each first spacer. The second spacers are disposed on the conductive layer and in the displaying area.

Based on the above object or other objects, the present invention also provides a liquid crystal display panel comprising an active device array substrate, a color filter substrate, and a liquid crystal layer. This color filter substrate may be the color filter substrate mentioned above, for example. And the liquid crystal layer is disposed between the color filter substrate and the active device array substrate.

In one embodiment of the present invention, said light shielding layer below the first concave further comprises a second concave therein, and the fixing part is disposed in the first concave and the second concave at the same time.

In one embodiment of the present invention, the material of said conductive layer may be indium tin oxide (ITO) or indium zinc oxidation (IZO).

In one embodiment of the present invention, the material of said first spacers and the second spacers may be photoresistive material.

In one embodiment of the present invention, said color filter substrate further comprises a seal frame disposed on the periphery of the displaying area.

In one embodiment of the present invention, said through hole is disposed at the central position of each first spacer.

In one embodiment of the present invention, the width of said through hole is between 6 and 200 µm, and preferably between 30 and 120 µm.

In one embodiment of the present invention, the width of the supporting part of each first spacer is identical to the width of each second spacer.

In one embodiment of the present invention, the shape of the first spacers may be hollow cylinder or hollow rectangular prism.

Based on the above object or other objects, the present invention further provides a manufactured method of a liquid crystal display panel comprising the following steps of: providing a first substrate on which a device layer has been formed; providing a second substrate as described in claim 1; forming a seal frame on the second substrate, or forming the seal frame on the first substrate which surrounds the displaying area; filling a liquid crystal layer in a space surrounded by the seal frame; combining the first substrate and the second substrate; curing the seal frame, and simultaneously the first spacers sucking and fixing the first substrate and the second substrate; and removing the first spacers and a corresponding part of the first substrate and the second substrate.

In one embodiment of the present invention, the method for curing the seal frame may be UV irradiation or heating method.

Based on the above object or other objects, the present invention also provides a liquid crystal display panel comprising an active device array substrate, a transparent substrate, and a liquid crystal layer. The active device array substrate has a display region and a dummy region, and the active device array substrate include the light shielding layer, color filter layer, a plurality of first spacers, and a plurality of second spacers. The light shielding layer is disposed on the active device array substrate. The color filter layer is disposed on the active device array substrate and is covering the light shielding layer, in which the color filter layer disposed in the dummy region has at least a first concave. A plurality of first spacers are disposed on the color filter layer and are disposed in the dummy region, and every first spacer has a fixing part, and a supporting part is disposed on the fixing part, and a through hole is disposed at every first spacer, and the fixing part is disposed inside the first concave. A plurality of second spacers are disposed on the color filter layer and inside the display region. The transparent substrate is disposed above the active device array substrate. The liquid crystal layer is disposed between the active device array substrate and the transparent substrate.

In one embodiment of the present invention, the aforementioned liquid crystal display further comprises a common electrode, which is disposed on the transparent substrate.

In one embodiment of the present invention, said light shielding layer below the first concave further comprises a second concave therein, and the fixing part is disposed in the first concave and the second concave at the same time.

In one embodiment of the present invention, the material of said the first spacers and the second spacers may be photo-resistive material.

In one embodiment of the present invention, said color filter substrate further comprises a seal frame disposed on the periphery of the displaying area of the substrate.

In one embodiment of the present invention, said through hole is disposed at the central position of each first spacer.

In one embodiment of the present invention, the width of said through hole is between 6 and 200 μm, and preferably between 30 and 120 μm.

In one embodiment of the present invention, the width of the supporting part of each first spacer is identical to the width of each second spacer.

In one embodiment of the present invention, the shape of the first spacers may be hollow cylinder or hollow rectangular prism.

In the color filter substrate provided by the present invention, since multiple first spacers having through holes are disposed on the dummy area, the first spacers used can have the functions of supporting substrates and also sucking and fixing the two substrates, in manufacturing large-scale LCD panels. And therefore, the warp on edges of the substrate for LCD panel won't appear, and the misalignment situation between the color filter substrate and the active device array substrate can be avoided. Hence, the yield of manufacturing large-scale LCD panels can be raised.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 4A to 4F are cross-sectional view schematically showing the steps of the manufactured method of a LCD panel according to one preferred embodiment of the present invention.

DESCRIPTION OF THE PREFERRED EMBODIMENTS

Figure 1:
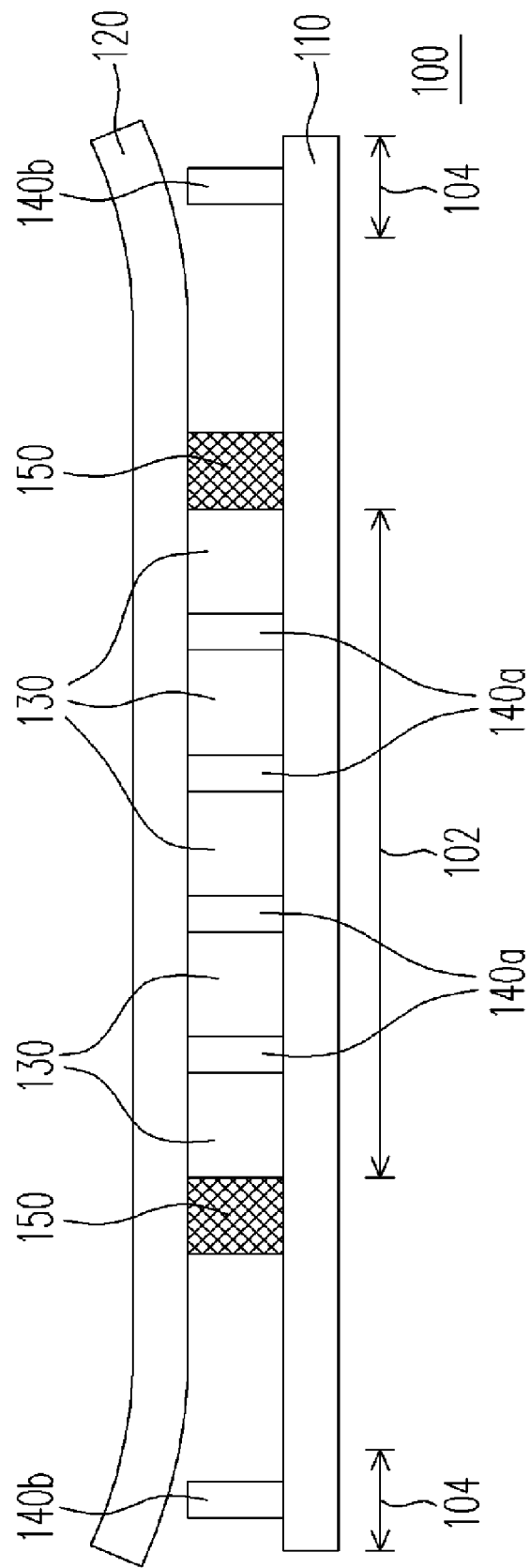
FIG. 1 is a cross-sectional view of a traditional large-scale LCD panel.
Figure 2:
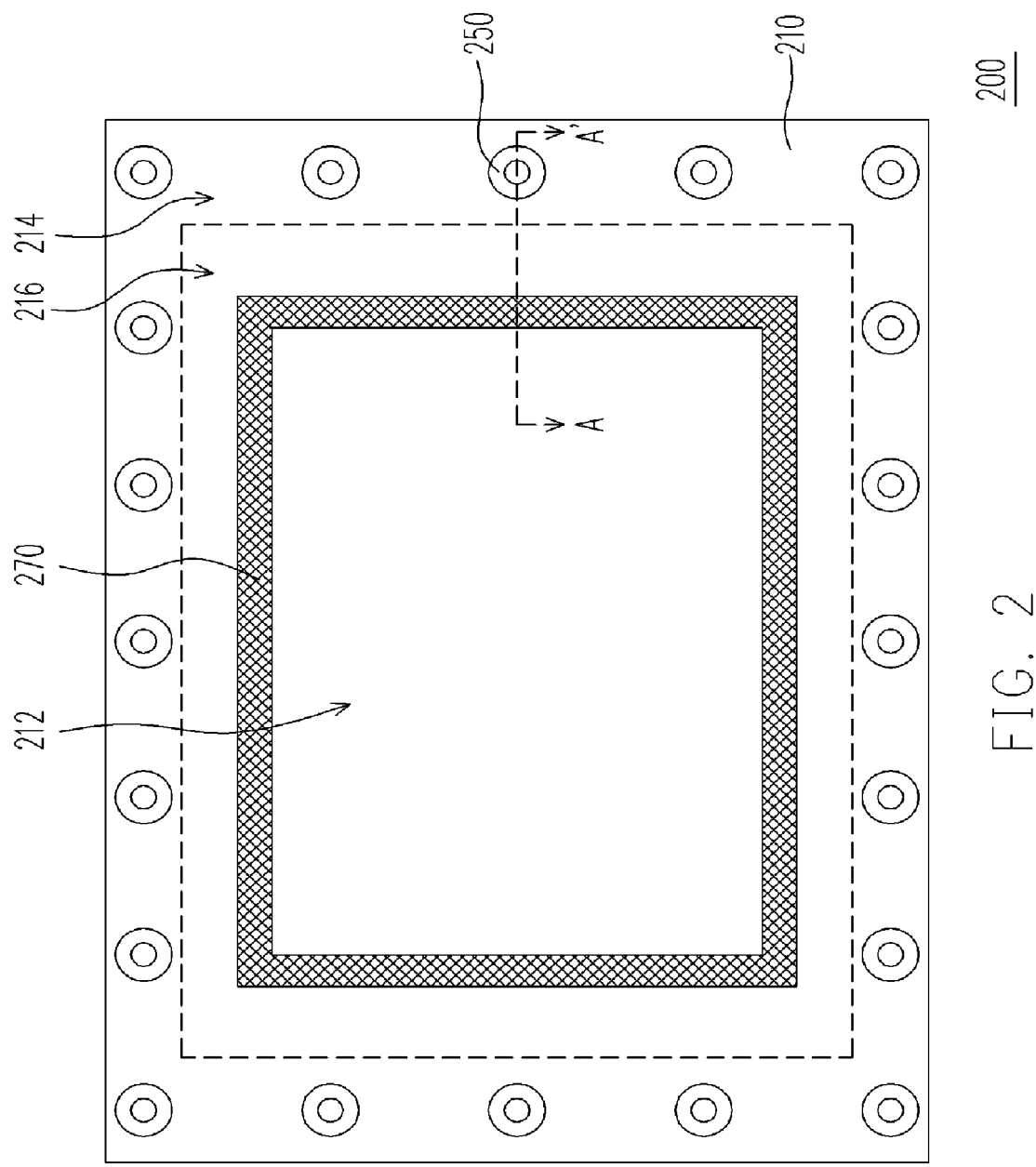
FIG. 2 is a top view schematically showing a color filter substrate according to one preferred embodiment of the present invention.
Figure 2A:
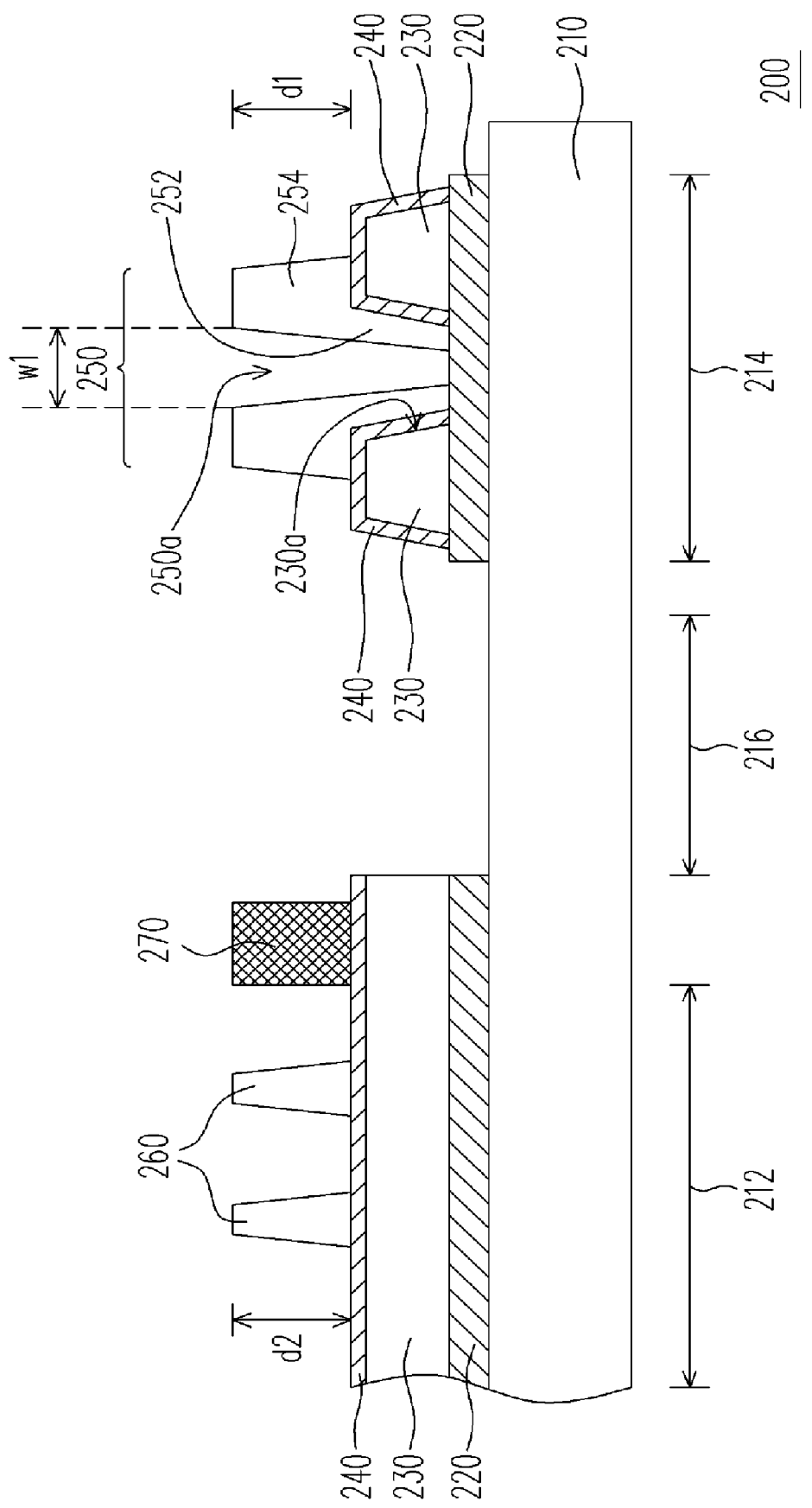
FIG. 2A is a cross-sectional view taken along A-A' line in FIG. 2.

FIG. 2 is a top view schematically showing a color filter substrate according to one preferred embodiment of the present invention, and FIG. 2A is a cross-sectional view taken along A-A' line in FIG. 2. Referring to FIGS. 2 and 2A, the color filter substrate 200 comprises a substrate 210, a light shielding layer 220, a color filter layer 230, a conductive layer 240, a plurality of first spacers 250, and a plurality of second spacers 260. The substrate 210 has a displaying area 212 and a dummy area 214. The light shielding layer 220 is disposed on the substrate 210. The color filter layer 230 is disposed in the sub-pixel region and covers the light shielding layer 220, and wherein the color filter layer 230 disposed in the dummy area 214 owns at least a first concave 230a. The conductive layer 240 is disposed on the substrate 210 and covers the color filter layer 230 and the light shielding layer 220. The first spacers 250 are disposed on the conductive layer 240 and in the dummy area 214, and wherein each first spacer 250 owns a fixing part 252 and a supporting part 254 which is above the fixing part 252. This fixing part 252 is disposed inside the first concave 230a, and there exists a through hole 250a in each first spacer 250. The second spacers 260 are disposed on the conductive layer 240 and in the displaying area 212.

In one embodiment of the present invention, the light shielding layer 220 in the displaying area 212 defines multiple sub-pixel regions (not shown) for the displaying area 212, and the color filter layer 230 is disposed on the sub-pixel regions and covers the light shielding layer 220. In more detail, the color filter layer 230 may be composed of multiple color photo-resistive blocks, and alternatively it may be one color photo-resistive block selected among red, green and blue color photo-resistive blocks, for example. In addition, the red, green and blue color photo-resistive blocks can be arranged in the form of Mosaic type, strip type, four pixels type, triangle type, and so on. The material of the conductive layer 240 may be indium tin oxide (ITO) or indium zinc oxidation (IZO) and it may be formed by using the sputtering technique, for example.

Still referring to FIGS. 2 and 2A, in one embodiment of the present invention, the color filter substrate 200 further comprises a seal frame 270 disposed on periphery of the displaying area 212 of substrate 200. By using the seal frame 270 together with one drop fill (ODF) process, liquid crystal can be quickly filled in the displaying area 212. The material of the seal frame 270 may be UV glue or thermal cure glue, and by applying ultraviolet irradiation or heating process such that the color filter substrate 200 and the active device array substrate (not shown) can be combined together.

It's worthy to note that, the color filter substrate 200 shown in FIGS. 2 and 2A includes a dummy area 214 disposed on the outside of non-displaying area 216, and electronic devices used for controlling the LCD panel are disposed on the active device array substrate opposite to this non-displaying area 216. In particular, a plurality of first spacers 250 are disposed in the dummy area 214. And the first spacer 250 owns a through hole 250a and therefore can produce suction effect for the first spacer. In this way, the first spacers 250 provide not only the function of supporting the substrates but functions of sucking and fixing the substrates. Additionally, in one embodiment of the present invention, the first spacers 250 can be hollow cylinder as shown in FIG. 2 or hollow rectangular prism in shape (not shown).

Also, referring to FIG. 2A, the material of the first spacers 250 and second spacers 260 may be photo-resistive material for example and they may be fabricated by the photolithography technique. Thus, the distribution locations for first spacers 250 and second spacers 260 on the substrate 210 can be precisely controlled. Besides, the thickness d1 of the supporting part 254 of each first spacer 250 is identical to the thickness d2 of each second spacer 260.

Particularly, the through holes 250a of the first spacers 250 are disposed at the central position of each first spacer 250 and its width w1 is between 6 and 200 μm, and preferably between 30 and 120 μm. By doing so, the first spacers 250 can provide preferable effect of attaching two substrates. It's worthy to note that, as shown in FIG. 2A, the fixing part 252 of the first spacers 250 are disposed inside the first concave 230a of the color filter layer 230. Hence, not only the sucking space of the first spacers 250 can be increased for enhancing the ability of sucking and fixing the substrate, but dropping of the first spacers 250 can be avoided when the panel is subject to the lateral stress.

Figure 2B:
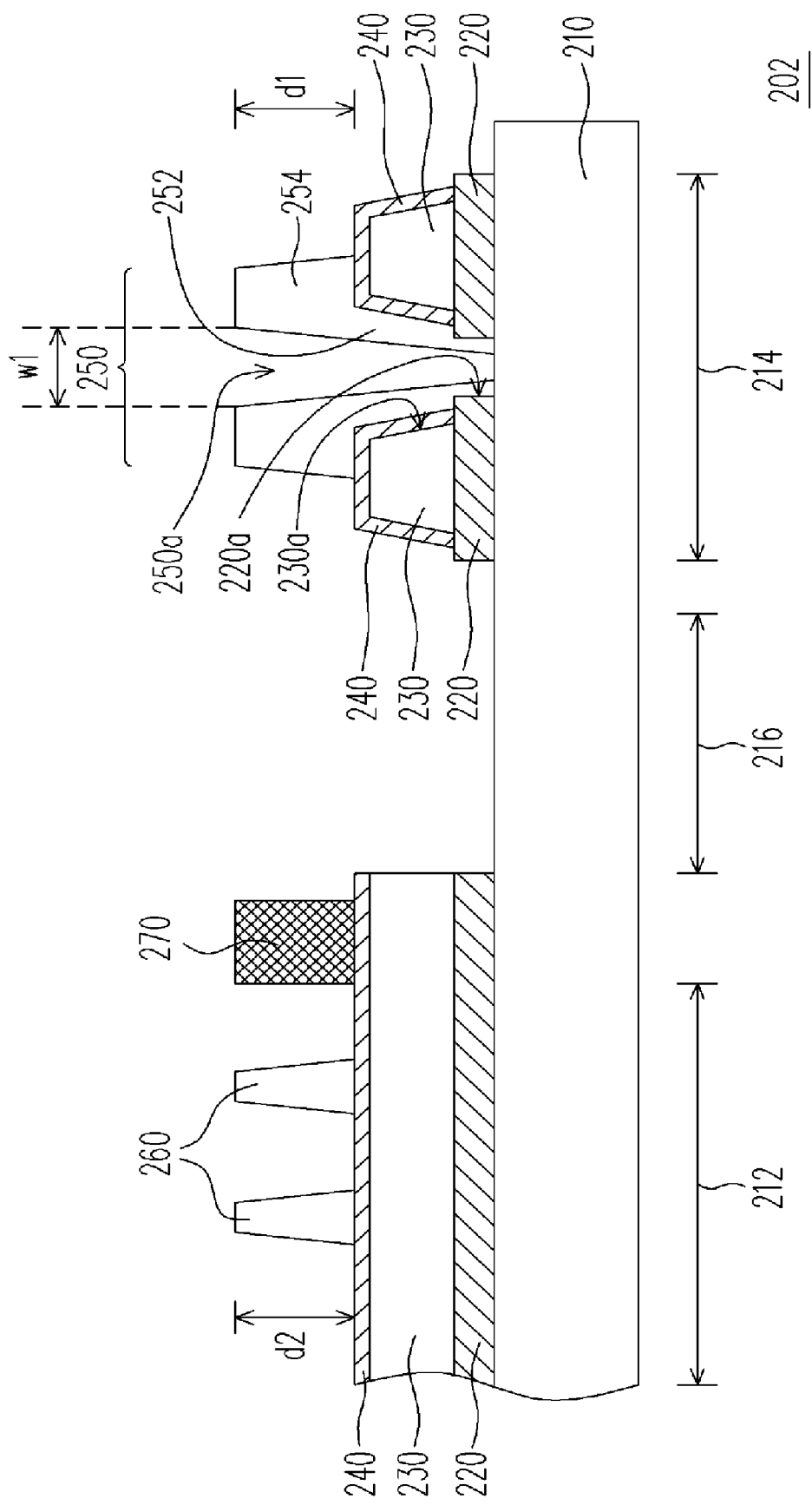
FIG. 2B is a cross-sectional view schematically showing another color filter substrate according to one preferred embodiment of the present invention.

FIG. 2B is a cross-sectional view schematically showing another color filter substrate according to one preferred embodiment of the present invention. Referring to FIG. 2B, for the color filter substrate 202 similar components are referred as the same numerals, and will not repeated herein. It's worthy to note that, a second concave 220a is further comprised in the light shielding 220 below the first concave 230a, and the fixing part 252 is simultaneously disposed in the first concave 230a and the second concave 220a. Therefore, the first spacers 250 for the color filter substrate 202 in FIG. 2 have a larger sucking space and thereby better ability of sucking and fixing substrates. Furthermore, the first spacers 250 is attached on the color filter layer 230 and light shielding layer 220 simultaneously, and thus capable of bearing larger lateral stress and avoiding the dropping of first spacers 250.

To sum up, on the dummy area 214 of the color filter substrates are disposed the first spacers 250 having through holes 250a, and these first spacers 250 are partly disposed above the color filter layer 230 and/or light shielding layer 220. Accordingly, in manufacturing large-scale LCD panels the first spacers 250 can be used to provide functions of supporting substrates, and sucking and fixing substrates as well. Therefore, the problems of edge-warpage and misalignment of substrates can be avoided. Also, the first spacers 250 won't drop when being subject to the lateral stress, thereby reducing the possibility of misalignment problem for substrates.

Figure 3:
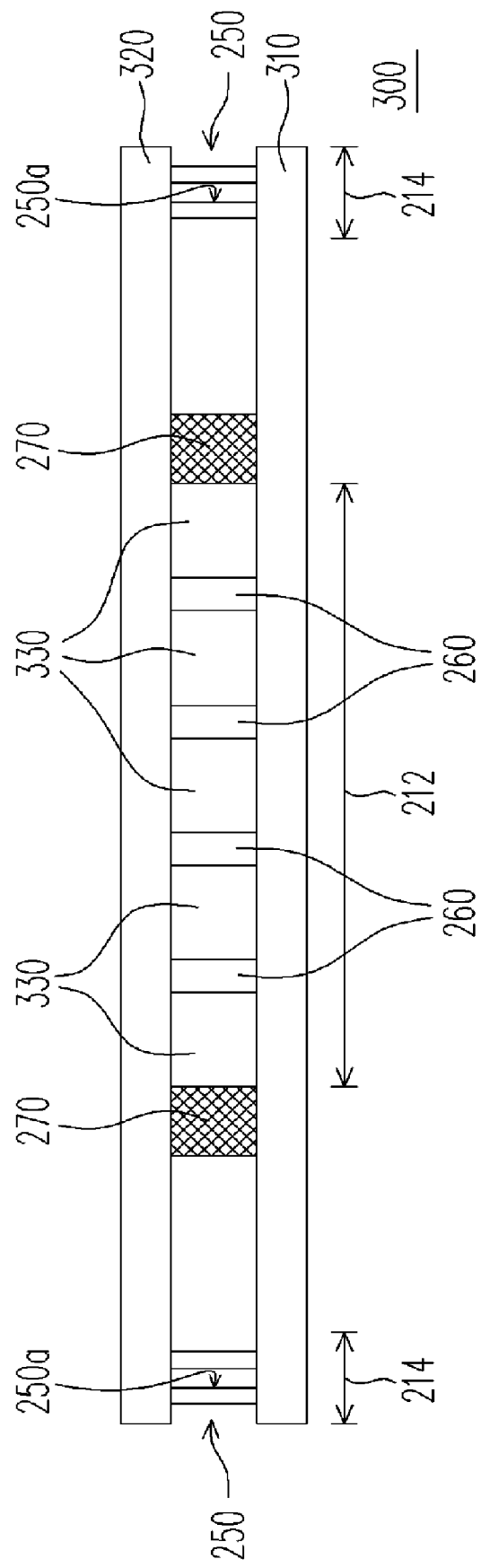
FIG. 3 is a cross-sectional view schematically showing a LCD panel according to one preferred embodiment of the present invention.

FIG. 3 is a cross-sectional view schematically showing a LCD panel according to one preferred embodiment of the present invention. Referring to FIG. 3, the LCD panel 300 comprises a active device array substrate 310, a color filter substrate 320, and a liquid crystal layer 330. Wherein, the color filter substrate 320 may be the the color filter substrates 200 or 202 mentioned above for example, and similar components are referred to the same numerals and will not repeated herein. And the liquid crystal layer 330 is disposed between the color filter substrate 320 and the active device array substrate 310.

The active device array substrate 310 comprises a plurality of active devices (not shown), scan lines (not shown) and data lines (not shown). The scan lines and data lines partition the active device array substrate into a plurality of pixel regions (not shown), and active devices are disposed in each pixel regions, respectively. The active devices may be thin film transistors and they are driven by scan lines and data lines.

It's worthy to note that, on the color filter substrate 320 are disposed the first spacers 250 which have through holes 250a and are provided for sucking and fixing the color filter substrate 320 and the active device array substrate 310. In one embodiment of the present invention, the first spacers 250 may be disposed on the active device array substrate 310, that is, for the case that the LCD panel 300 is composed of a color filter on array (COA) substrate, a transparent substrate and a liquid crystal layer combined together. In more detail, the COA substrate is fabricated by forming the components, including the color filter layer 230 shown in FIG. 2A or 2B, light shielding layer 220, the first and the second spacers 250, 260, on the active device array substrate 310, and another substrate 320 is a transparent substrate having a common electrode (not shown). In addition, another liquid crystal layer is disposed in the aforementioned two substrates (not shown). Therefore, the aforementioned liquid crystal display of the COA format (not shown) is able to utilize the first spacers 250 having the through holes 250a, thereby providing suctioning to secure COA substrate and the transparent substrate, thus allowing the borders of the substrate to not having warp or misalignment behaviors. Meanwhile, all of the corresponding embodiments of the first spacers 250 is similar to the aforementioned, therefore, no further descriptions are required.

To sum up, in manufacturing the large-scale display panels, provided that on the dummy area 214 are disposed the first spacers 250 having through holes 250a, these first spacers 250 provided can have the functions of supporting and further sucking and fixing the substrates. Accordingly, the warp or misalignment occurring on edges of the LCD panel 300 can be avoided, thereby raising the manufacturing yield of LCD panel 300.

FIGS. 4A to 4F are cross-sectional view schematically showing the steps of the manufactured method of a LCD panel according to one preferred embodiment of the present invention. First, referring to FIG. 4A, a first substrate 410 on which a device layer 412 is already formed is provided. This first substrate 410 may be a TFT array substrate for example, and this device layer 412 includes therein a plurality of scan lines (not shown), a plurality of data lines (not shown), and a plurality of TFTs (not shown). These TFTs are driven by the scan lines and data lines.

Next, referring to FIG. 4B, a second substrate 420 is provided, which may be the color filter substrates 200, 202 shown in FIG. 2A or FIG. 2B, and wherein similar components are referred to the same numerals. The second substrate 420 has a displaying area 422 in which a plurality of second spacers 260 (shown in FIG. 4C) are disposed and a dummy area 424 in which a plurality of first spacers 250 are disposed.

Thereafter, referring to FIGS. 4C and 4D simultaneously, a seal frame 430 is formed on the second substrate 420 and it surrounds the displaying area 422. The seal frame 430 may be formed by using the coating method and the material of it may be UV quill gel and thermal quill gel. Also, a liquid crystal layer 440 provided is filled in the space which is formed by the seal frame 430, as shown in FIG. 4D. The manufacturing process used to fill the LC layer 440 can be one drop fill (ODF) technique. It's worthy to note that, the seal frame 430 mentioned above can also be fabricated on the first substrate 410 and surrounds the device layer 412, and the LC layer 440 is filled in the space formed by the seal frame 430 which surrounds the first substrate 410 (not shown) accordingly.

Figure 4E:
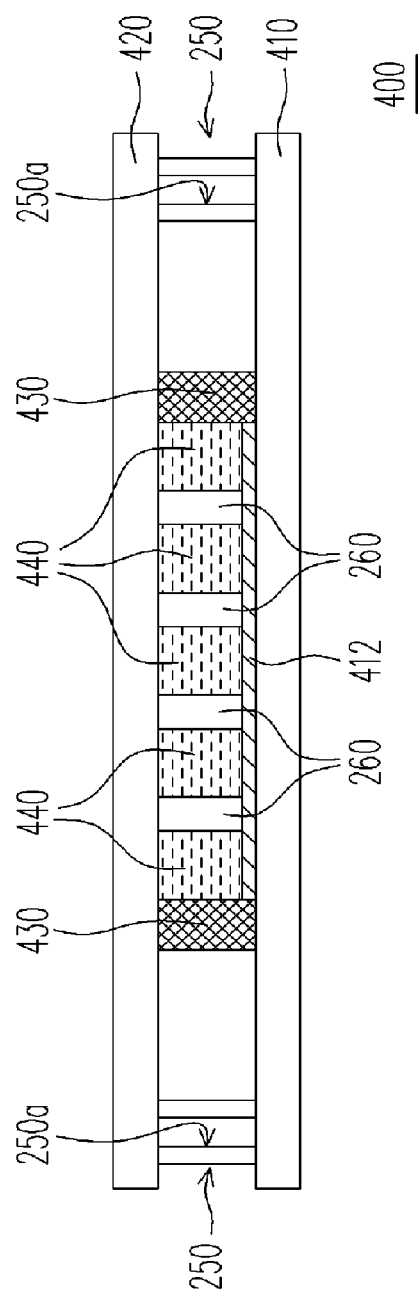

After that, referring to FIG. 4E, the first substrate 410 and the second substrate 420 are combined together. Here, the first spacers 250 can support the first substrate 410 and second substrate 420 to prevent the seal frame 430 from deforming and avoiding the misalignment between substrates 410 and 420.

Particularly, since the above-mentioned steps in FIGS. 4A to 4F are operated under the vacuum condition, for further curing the seal frame 430 to combine the first substrate 410 and the second substrate 420 together, the LCD panel 400 must be taken out of the vacuum environment to perform the curing step for the seal frame 430.

Then, referring to FIG. 4E, the step of curing the seal frame 430 is performed. In one embodiment, the curing of the seal frame 430 may be performed by using UV irradiation method or heating method. It's worthy to note that, since the LCD panel 400 is not subject to the vacuum environment at this time, a suction force that sucks and fixes substrates 410 and 420 appears around the location where the first spacers 250 with through holes 250a are. Consequently, for the LCD panel 400 the problem that edge-warpage of the substrate occurs in the prior art can be solved. Also, the first spacers 250 can be used for assisting the supporting of substrates 410 and 420. Thus, before the seal frame 430 is cured, the insufficient supporting force which causes misalignment of substrates can be avoided for the LCD panel 400 of the present invention.

Figure 4F:
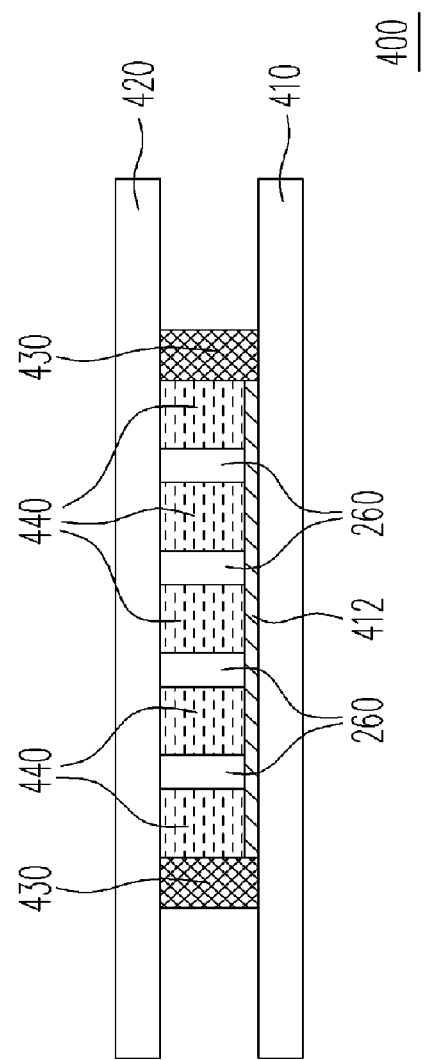

Later, referring to FIG. 4F, the step of removing the first spacers 250 and its corresponding part of the first substrate 410 and second substrate 420 is performed. Since that after the seal frame 430 is cured, the LCD panel 400 is provided with sufficient supporting force, the first substrate 410, the second substrate 420 and the first spacers in the dummy area 424 can be cut off. Accordingly, it can be known that the manufactured method of a LCD panel provided by the present invention is to utilize first spacers 250 to solve the problems of edge-warp and misalignment of substrates, and thereby raising the manufacturing yield of large-scale LCD panels.

In summary, the color filter substrate, the LCD panel and the manufactured method thereof, provided by the present invention, has the advantages as follows.

1. There are provided multiple first spacers which have through holes on the dummy area of the color filter substrate. These first spacers can have the functions of supporting substrates and also of sucking and fixing the two substrates, in manufacturing large-scale LCD panels.

2. The warp on edges of the substrate for LCD panel of the present invention won't appear, and the misalignment situation between the color filter substrate and the active device array substrate can be avoided.

3. By utilizing the manufacturing method of a liquid crystal display panel, the warpage on edges of the substrate can be avoided and the misalignment problem between the color filter substrate and the active device array substrate can be solved. Hence, the manufacturing yield of large-scale LCD panel can be raised.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A color filter substrate, comprising:
    a substrate having a displaying area and a dummy area;
    a light shielding layer disposed on the substrate;
    a color filter layer disposed on the substrate and covering the light shielding layer, wherein the color filter layer in the dummy area having at least a first concave groove;
    a conductive layer disposed on the substrate and covering the color filter layer and the light shielding layer;
    a plurality of first spacers disposed on the conductive layer and in the dummy area, each first spacer having a fixing part and a supporting part which is above the fixing part, a through hole is in each spacer and the fixing part is disposed in the first concave groove; and
    a plurality of second spacers disposed on the conductive layer and in the displaying area.

2. The color filter substrate according to claim 1, wherein the light shielding layer below the first concave groove further comprises a second concave groove therein, and the fixing part is disposed in the first concave groove and the second concave groove at the same time.

3. The color filter substrate according to claim 1, wherein the material of the conductive layer includes indium tin oxide (ITO) or indium zinc oxidation (IZO).

4. The color filter substrate according to claim 1, wherein the material of the first spacers and the second spacers includes photo-resistive material.

5. The color filter substrate according to claim 1, further comprising a seal frame disposed on the periphery of the displaying area.

6. The color filter substrate according to claim 1, wherein the through hole is disposed at the central position of each first spacer.

7. The color filter substrate according to claim 1, wherein the width of the through hole is between 6 and 200 µm.

8. The color filter substrate according to claim 1, wherein the width of the supporting part of each first spacer is identical to the width of each second spacer.

9. The color filter substrate according to claim 1, wherein the shape of the first spacers includes hollow cylinder or hollow rectangular prism.

10. A liquid crystal display panel, comprising;
an active device array substrate;
a color filter substrate as described in claim 1; and
a liquid crystal layer disposed between the active device array substrate and the color filter substrate.

11. The liquid crystal display panel according to claim 10, wherein the light shielding layer below the first concave groove further comprises a second concave groove therein, and the fixing part is disposed in the first concave groove and the second concave groove at the same time.

12. The liquid crystal display panel according to claim 10, wherein the material of the conductive layer includes indium tin oxide (ITO) or indium zinc oxidation (IZO).

13. The liquid crystal display panel according to claim 10, wherein the material of the first spacers and the second spacers includes photo-resistive material.

14. The liquid crystal display panel according to claim 10, further comprising a seal frame disposed on the periphery of the displaying area.

15. The liquid crystal display panel according to claim 10, wherein the through hole is disposed at the central position of each first spacer.

16. The liquid crystal display panel according to claim 10, wherein the width of the through hole is between 6 and 200 μm.

17. The liquid crystal display panel according to claim 10, wherein the width of the supporting part of each first spacer is identical to the width of each second spacer.

18. The liquid crystal display panel according to claim 10, wherein the shape of the first spacers includes hollow cylinder or hollow rectangular prism.

19. A liquid crystal display panel, comprising;
an active device array substrate, having a display region and a dummy region, wherein the active device array substrate comprising:
a light shielding layer, disposed on the active device array substrate;
a color filter substrate, disposed on the active device array substrate and covering the light shielding layer, wherein the color filter layer disposed in the dummy region has at least a first concave groove;
a plurality of first spacers, disposed on the color filter layer and in the dummy region, and every first spacer has a fixing part, and a supporting part disposed on the fixing part, and a through hole disposed at every first spacer, and the fixing part disposed inside the first concave groove;
a plurality of second spacers, disposed on the color filter layers and inside the display region;
a transparent substrate, disposed above the active device array substrate; and
a liquid crystal layer, disposed between the active device array substrate and the transparent substrate.

20. The liquid crystal display panel according to claim 19, wherein further comprises a common electrode, disposed on the transparent substrate.

21. The liquid crystal display panel according to claim 19, wherein the light shielding layer below the first concave groove further comprises a second concave groove therein, and the fixing part is disposed in the first concave groove and the second concave groove at the same time.

22. The liquid crystal display panel according to claim 19, wherein the material of the first spacers and the second spacers includes photo-resistive material.

23. The liquid crystal display panel according to claim 19, further comprising a seal frame disposed on the periphery of the displaying area.

24. The liquid crystal display panel according to claim 19, wherein the through hole is disposed at the central position of each first spacer.

25. The liquid crystal display panel according to claim 19, wherein the width of the through hole is between 6 and 200 μm.

26. The liquid crystal display panel according to claim 19, wherein the width of the supporting part of each first spacer is identical to the width of each second spacer.

27. The liquid crystal display panel according to claim 19, wherein the shape of the first spacers includes hollow cylinder or hollow rectangular prism.

* * * * *